United States Patent
Adachi

(10) Patent No.: US 8,670,079 B2
(45) Date of Patent: Mar. 11, 2014

(54) VIDEO DISPLAY DEVICE

(75) Inventor: Takeshi Adachi, Saitama (JP)

(73) Assignees: Mitsumi Electric Co., Ltd., Tokyo (JP); ATRC Corporation, Saitama (JP)

( * ) Notice: Subject to any disclaimer, the term of this patent is extended or adjusted under 35 U.S.C. 154(b) by 144 days.

(21) Appl. No.: 13/062,534

(22) PCT Filed: Dec. 10, 2008

(86) PCT No.: PCT/JP2008/072447
§ 371 (c)(1),
(2), (4) Date: Mar. 7, 2011

(87) PCT Pub. No.: WO2010/029649
PCT Pub. Date: Mar. 18, 2010

(65) Prior Publication Data
US 2011/0157482 A1    Jun. 30, 2011

(30) Foreign Application Priority Data
Sep. 10, 2008  (JP) ................... 2008-232712

(51) Int. Cl.
*H04N 5/66* (2006.01)
(52) U.S. Cl.
USPC .......................... 348/739; 348/835
(58) Field of Classification Search
USPC ................... 348/342, 739, 743, 835
See application file for complete search history.

(56) References Cited

U.S. PATENT DOCUMENTS

| | | | |
|---|---|---|---|
| 7,068,328 B1 | 6/2006 | Mino | |
| 2003/0174886 A1* | 9/2003 | Iguchi et al. | 382/167 |
| 2006/0192898 A1 | 8/2006 | Mino | |
| 2007/0146236 A1* | 6/2007 | Kerofsky et al. | 345/7 |
| 2007/0160147 A1* | 7/2007 | Kondo et al. | 375/240.18 |
| 2007/0177030 A1* | 8/2007 | Yokoyama et al. | 348/222.1 |

FOREIGN PATENT DOCUMENTS

| | | |
|---|---|---|
| JP | 2001-126075 | 5/2001 |
| JP | 2007-142983 | 6/2007 |
| JP | 2007-158992 | 6/2007 |

OTHER PUBLICATIONS

Japanese Office Action dated Mar. 3, 2009.

* cited by examiner

*Primary Examiner* — Jeffeey Harold
*Assistant Examiner* — Justin Sanders
(74) *Attorney, Agent, or Firm* — IPUSA, PLLC

(57) ABSTRACT

A video display device displays an image of an input video signal. In the video display device, the video signal is supplied to a frequency component analyzing device, and the frequency component analyzing device extracts a frequency of each of frequency bands from video information of one screen with respect to the image. An image quality control circuit of the video display device performs an image quality control of the image based on the extracted frequencies of the respective frequency bands.

8 Claims, 12 Drawing Sheets

FIG.11B

| FREQUENCY | CONTRAST | BLACK LEVEL | COLOR | SHARPNESS | NOISE REDUCTION |
|---|---|---|---|---|---|
| HIGH FREQUENCY (H) | LINEAR | OFFSET | YC | SMALL | SMALL |
| MIDDLE FREQUENCY (M) | MIDDLE | MIDDLE | MIDDLE | MIDDLE | MIDDLE |
| LOW FREQUENCY (L) | GAMMA CURVE | BLACK EMPHASIS | C | LARGE | LARGE |

VIDEO DISPLAY DEVICE

TECHNICAL FIELD

The present disclosure generally relates to a video display device, and more particularly to a video display device, such as a television or a monitor.

BACKGROUND ART

In recent years, with digitization of image broadcasting and utilization of high-definition television broadcasting, image information with high accuracy and high definition is provided by broadcasting. Even if such image information with high accuracy and high definition is supplied, a video display device that does not support the high-accuracy high-definition image information will not allow the viewer of the video display device to easily enjoy a displayed image with the intended high accuracy and high-definition.

In video display devices according to the related art, the technical innovation for a large-size screen and cost reduction is progressing. However, among them, there are only a small number of video display devices which sufficiently support the high-accuracy high-definition image information transmitted by such image broadcasting.

In order to overcome the problem of such displayed image in the video display devices according to the related art, for example, Patent Document 1 listed below discloses a corrective image processing method.

Patent Document 1: Japanese Laid-Open Patent Publication No. 2007-142983

DISCLOSURE OF THE INVENTION

Problem to be Solved by the Invention

In the image quality improvement technology currently used in the video display devices according to the related art, the luminance elements and color elements of components of an input video signal are analyzed, and the image quality improvements of contrast, color reproduction, sharpness, noise reduction, etc. are performed in order to improve the image quality of a displayed image. However, the image quality improvement is performed in a fixed manner without considering the dependability of the frequency components of the input video signal.

Hence, a black filled-in phenomenon may occur in which high frequency components of an image at a dark place (a black hair in darkness, a crow in darkness, etc.) are filled in with the black level, or an image quality degradation phenomenon may occur at a medium luminance portion of an image due to a difference between the inclination of a rising edge of luminance information and the inclination of a rising edge of color information (or a difference of the rise timing caused by a frequency band difference).

In the above-described image quality improvement technology, regarding the sharpness control, sharpness levels (the amount of preshoot, the amount of overshoot, etc.) are set up in a fixed manner independently of the frequency components. Even if an image with good image quality is obtained in the case of low frequency components, various false shoot signals with the band width that is the same as that of the original video signal may be generated, in the case of high frequency components, which will lower the degree of sharpness and cause the image quality to be degraded.

In the above-described image quality improvement technology, regarding the noise reduction function, the noise reduction amount is set up in a fixed manner independently of the frequency components (when the noise and the high frequency components are closely analogous). In this case, the high frequency components of the original video signal are lost simultaneously, and even if a high-resolution video display device is used, a reproduced image will be faded and it will be difficult to obtain a high-definition image.

Thus, even if the image quality improvement technology is effective for the low frequency components of an image, using the image quality improvement technology for the high frequency components of the image may cause the image quality of a reproduced image to be degraded.

Accordingly, in one aspect, the present disclosure provides a video display device, such as a television or a monitor, which is capable of displaying a high-definition image with high image quality.

Means to Solve the Problem

In an embodiment which solves or reduces one or more of the above-mentioned problems, the present disclosure provides a video display device which displays an image of an input video signal, the video display device including: a frequency component analyzing device that receives the input video signal and extracts a frequency of each of frequency bands from video information of one screen with respect to the image; and an image quality control circuit that performs an image quality control of the image based on the extracted frequencies of the respective frequency bands.

The above-mentioned video display device may be arranged so that the frequency component analyzing device includes a plurality of band pass filters.

The above-mentioned video display device may be arranged so that the frequency component analyzing device includes a Fourier analyzing device.

The above-mentioned video display device may be arranged so that the frequency component analyzing device includes Gaussian-Laplacian filters.

The above-mentioned video display device may be arranged so that the image quality control device performs the image quality control of each of a linear compensation of contrast, a black level offset, a color correction, a sharpness, and a noise reduction function based on the extracted frequencies of the respective frequency bands.

The above-mentioned video display device may be arranged so that the image of the video signal is determined as being one of an image containing many high frequency components, an image containing many low frequency components, and an image containing average frequency components based on the histogram of the respective frequency bands, and the image quality control circuit performs the image quality control of each of a linear compensation of contrast, a black level offset, a color correction, a sharpness, and a noise reduction function based on a result of the determination.

The above-mentioned video display device may be arranged so that a histogram of the respective frequency bands is generated based on the extracted frequencies, and the image quality control circuit performs the image quality control of each of a linearity compensation of contrast, a black level offset, a color correction, a sharpness, and a noise reduction function based on the histogram.

The above-mentioned video display device may be arranged so that the image of the video signal is determined as being one of an image containing many high frequency components, an image containing many low frequency components, and an image containing average frequency components based on the histogram of the respective frequency bands, and the image quality control circuit performs the image quality control of each of a linear compensation of contrast, a black level offset, a color correction, a sharpness, and a noise reduction function based on a result of the determination.

The above-mentioned video display device may be arranged so that the video signal is a video signal of a motion picture.

Effect of the Invention

According to the present disclosure, it is possible to provide a video display device which can display a high-definition image with high image quality.

BRIEF DESCRIPTION OF THE DRAWINGS

FIG. 11B is a diagram for explaining the relationship between the histogram for each frequency band and the image quality control.

Figure 1:
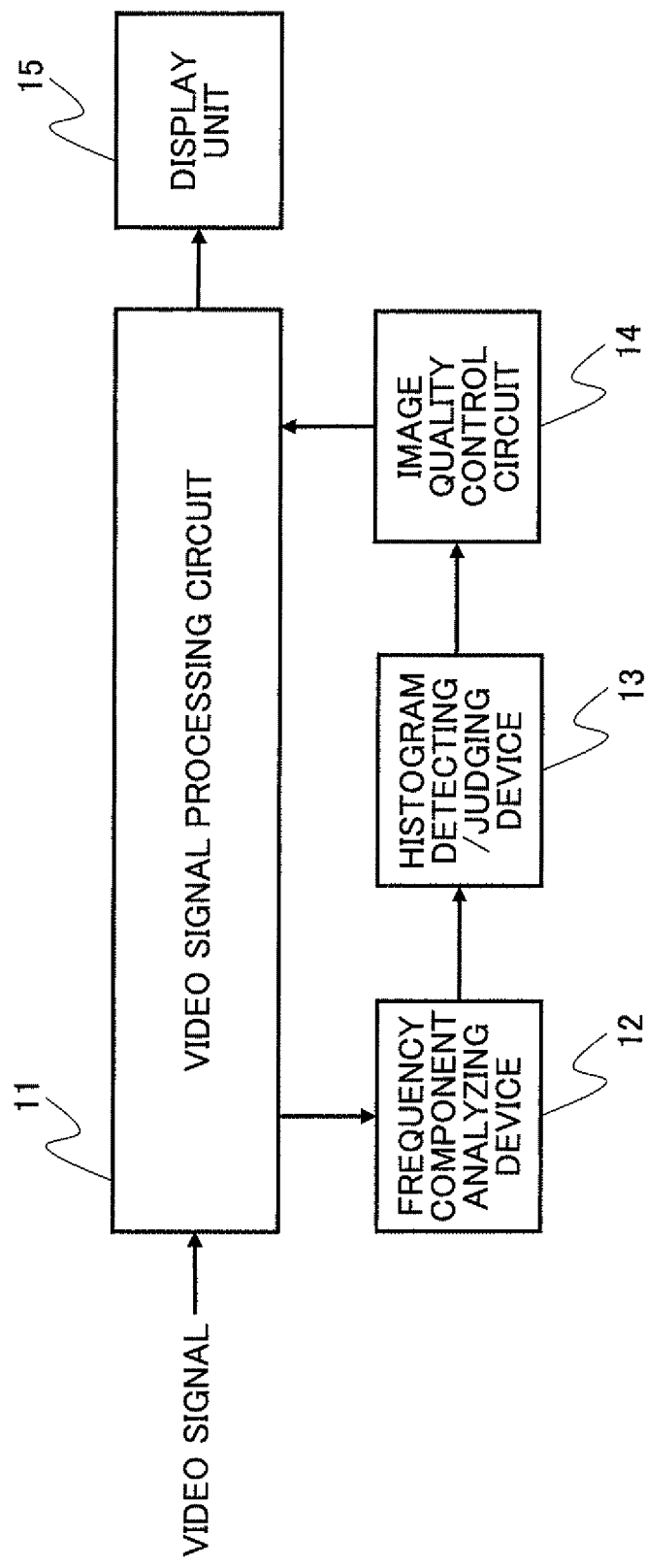
FIG. 1 is a diagram illustrating the composition of a video display device according to the present disclosure.

DESCRIPTION OF THE REFERENCE NUMERALS 11 video signal processing circuit
12 frequency component analyzing device
13 histogram detecting/judging device
14 image quality control circuit
15 display unit
20 input circuit
21 first band pass filter
22 second band pass filter
23 third band pass filter
24 fourth band pass filter
25 fifth band pass filter

BEST MODE FOR CARRYING OUT THE INVENTION

A description will be given of embodiments of the present disclosure with reference to the accompanying drawings.

In a video display device according to the present disclosure, an input video signal is supplied to a frequency analyzing device, and the frequency analyzing device extracts a frequency of each frequency band from video information of one screen of an image represented by the video signal. The video display device performs the image quality control of the image based on the distribution of the extracted frequencies of the respective frequency bands. The image quality control is performed with respect to each of contrast, black level, sharpness, color reproduction, noise reduction, etc.

With reference to FIG. 1, the video display device of the present disclosure will be described.

In the video display device of the present disclosure, a video signal is input to a video signal processing circuit 11, and the input video signal is supplied to a frequency component analyzing device 12.

In the frequency component analyzing device 12, a frequency of each frequency band is extracted. In a histogram detecting/judging device 13, a method of image quality control is determined based on the histogram of the respective frequency bands.

In an image quality control circuit 14, the image quality of the video signal in the video signal processing circuit 11 is adjusted based on the method of the image quality control determined by the histogram detecting/judging device 13. The video signal with the adjusted image quality is output to a display unit 15 so that the image of the video signal is displayed on the display unit 15.

First Embodiment

A video display device of a first embodiment of the present disclosure is arranged to include a frequency analyzing device 12 which uses a plurality of band pass filters.

Figure 2:
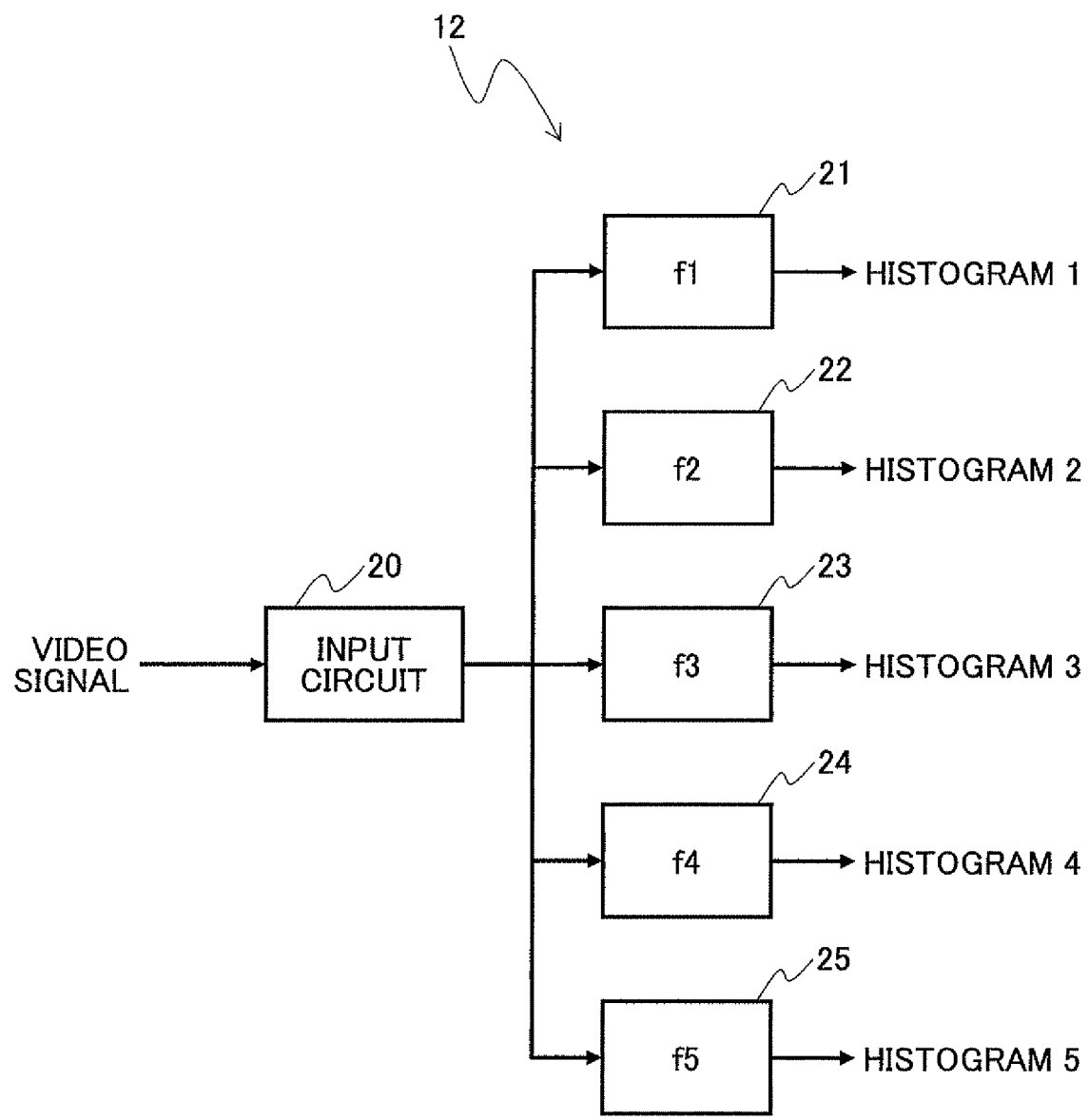
FIG. 2 is a diagram illustrating the composition of a frequency analyzing device having band pass filters in a video display device of a first embodiment of the present disclosure.

FIG. 2 illustrates the frequency analyzing device 12 using the band pass filters in this embodiment. The frequency analyzing device 12 in this embodiment includes five band pass filters with different pass bands. Specifically, the frequency analyzing device 12 includes a first band pass filter 21, a second band pass filter 22, a third band pass filter 23, a fourth band pass filter 24, and a fifth band pass filter 25.

Figure 3A:
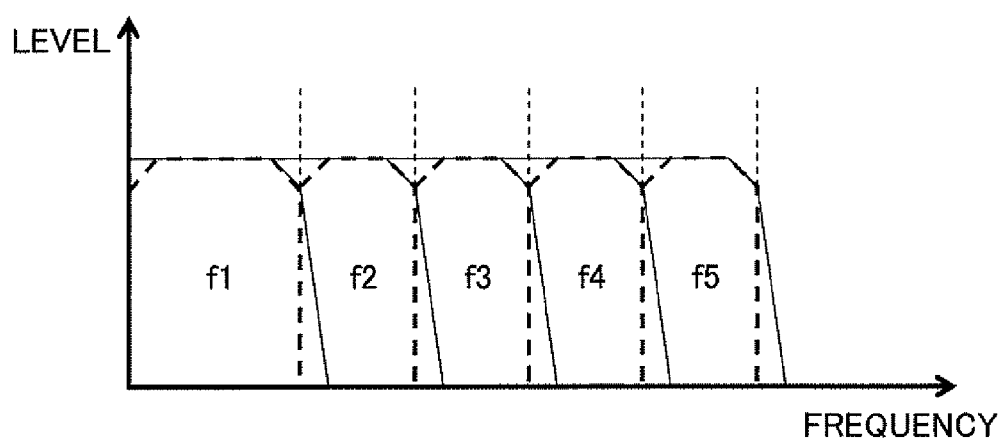
FIG. 3A is a diagram for explaining the frequency analysis in the first embodiment.

As illustrated in FIG. 3A, the first band pass filter 21 passes frequency components of a lowest frequency band f1. The second band pass filter 22 passes the frequency components of a second lowest frequency band f2. The third band pass filter 23 passes frequency components of a third lowest frequency band f3. The fourth band pass filter 24 passes frequency components of a fourth lowest frequency band f4. The fifth band pass filter 25 passes frequency components of a highest frequency band f5.

As illustrated in FIG. 2, an input video signal indicating video information of one screen (e.g. a motion picture) is supplied to an input circuit 20, and the video signal is supplied from the input circuit 20 to each of the first to fifth band pass filters 21, 22, 23, 24 and 25. A frequency of each frequency band in which the frequency components of the video signal pass a corresponding one of the first to fifth band pass filters 21, 22, 23, 24 and 25 is extracted, and a histogram is generated based on the extracted frequency of each frequency band.

Subsequently, the information (histogram) of the frequencies of the respective frequency bands of one screen is supplied to the histogram detecting/judging device 13. In the histogram detecting/judging device 13, analysis of the frequency components of the input video signal is performed based on the information (histogram) of the frequencies of the respective frequency bands of one screen. Specifically, the histogram detecting/judging device 13 analyzes the histogram of each frequency band and determines the distribution of the extracted frequencies of the respective frequency bands. In other words, the histogram detecting/judging device 13 determines whether the image of the video signal is one of an image containing many high frequency components, an image containing many low frequency components, and an image containing average frequency components only. In the image quality control circuit 14, the image quality control is performed based on the determined distribution from the histogram detecting/judging device 13.

Figure 3B:
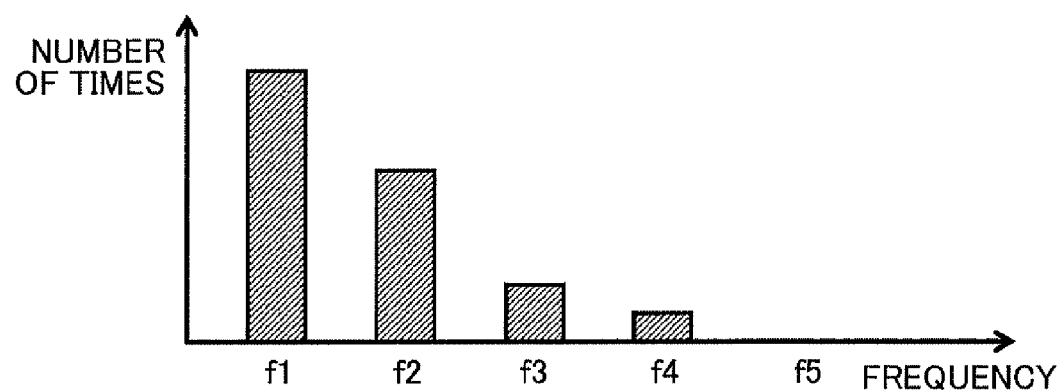
FIG. 3B is a diagram for explaining the frequency analysis in the first embodiment.

FIG. 3B illustrates the case of an image containing many low frequency components in one screen (from which the low frequency components are frequently extracted). In this case, the lower the frequency of the video signal, the larger the value of the frequency of the histogram.

Figure 3C:
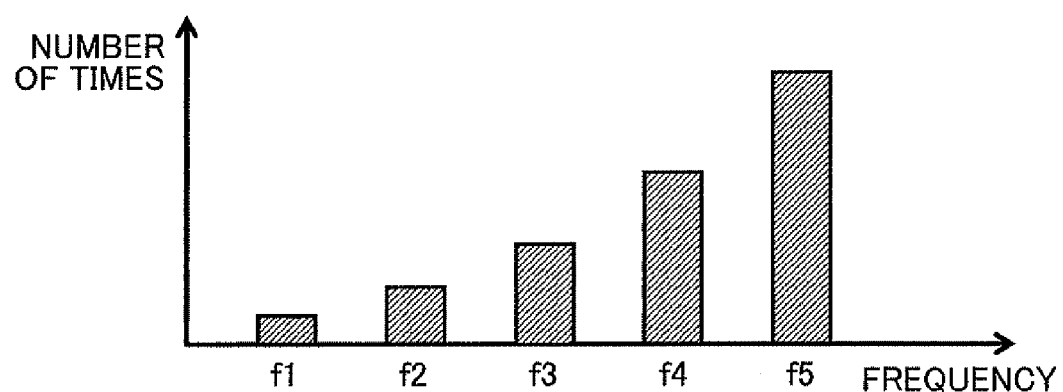
FIG. 3C is a diagram for explaining the frequency analysis in the first embodiment.

On the other hand, FIG. 3C illustrates the case of an image containing many high frequency components in one screen (from which the high frequency components are frequently extracted). In this case, the higher the frequency of the video signal, the larger the value of the frequency of the histogram.

Figure 4:
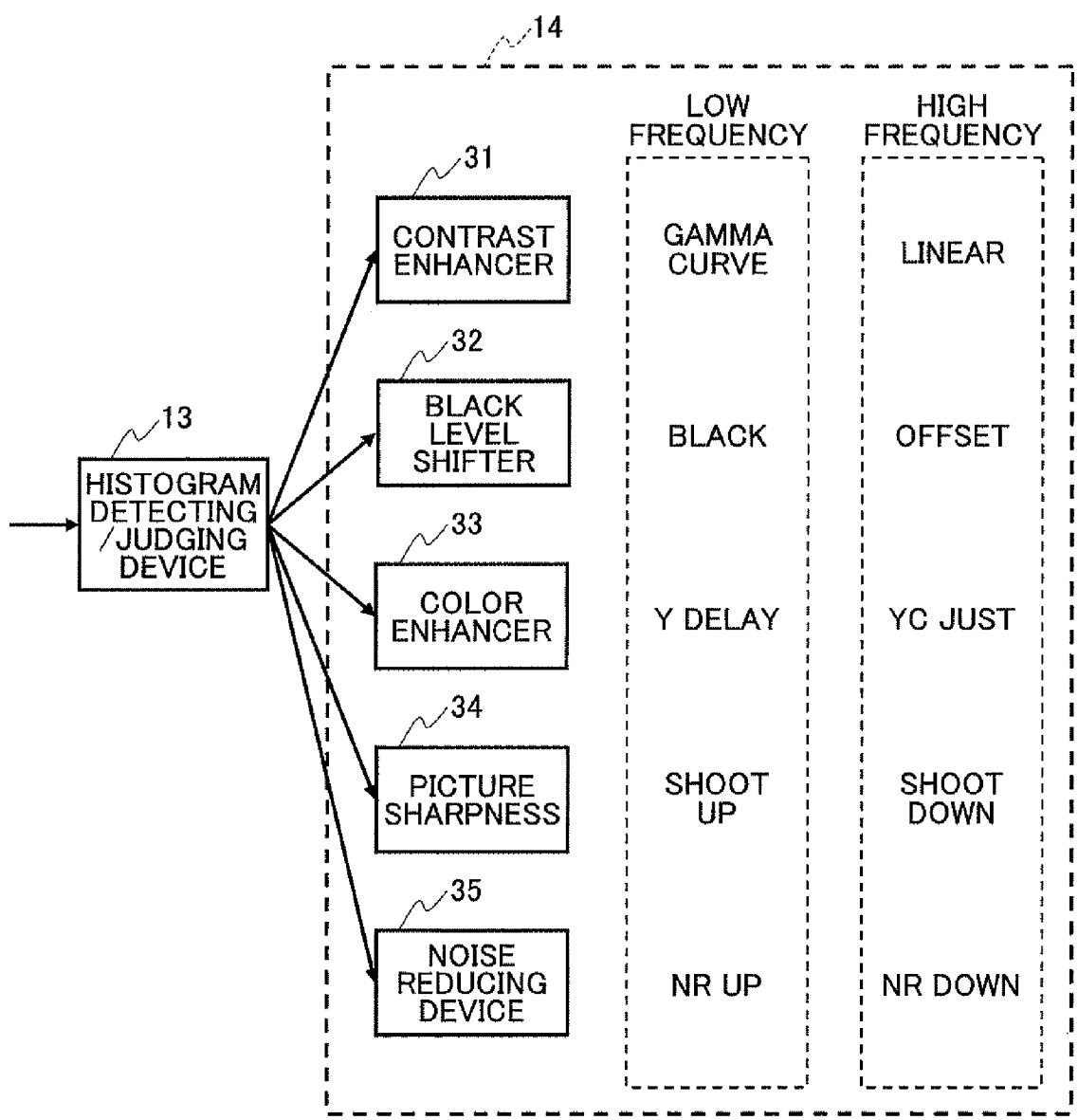
FIG. 4 is a diagram illustrating the composition of an image quality control circuit in the first embodiment.

The image quality control circuit 14 is provided for controlling the image quality. As illustrated in FIG. 4, the image quality control circuit 14 includes a contrast enhancer 31, a black level shifter 32, a color enhancer 33, a picture sharpness unit 34, and a noise reducing device 35. The control of the image quality is performed to adjust the image quality of each frequency band respectively based on the result of the analysis of the histogram of each frequency band of one screen received from the histogram detecting/judging device 13.

Next, the control of the contrast enhancer 31 will be described with reference to FIG. 5.

The contrast enhancer 31 is provided for adjusting the contrast of an image. When the histogram detecting/judging device 13 determines that the image is an image containing many low frequency components, changing the contrast to a high contrast level is needed, and a characteristic curve of the contrast with a large gamma correction is generated as indicated by the dotted line 51 in FIG. 5.

Figure 5:
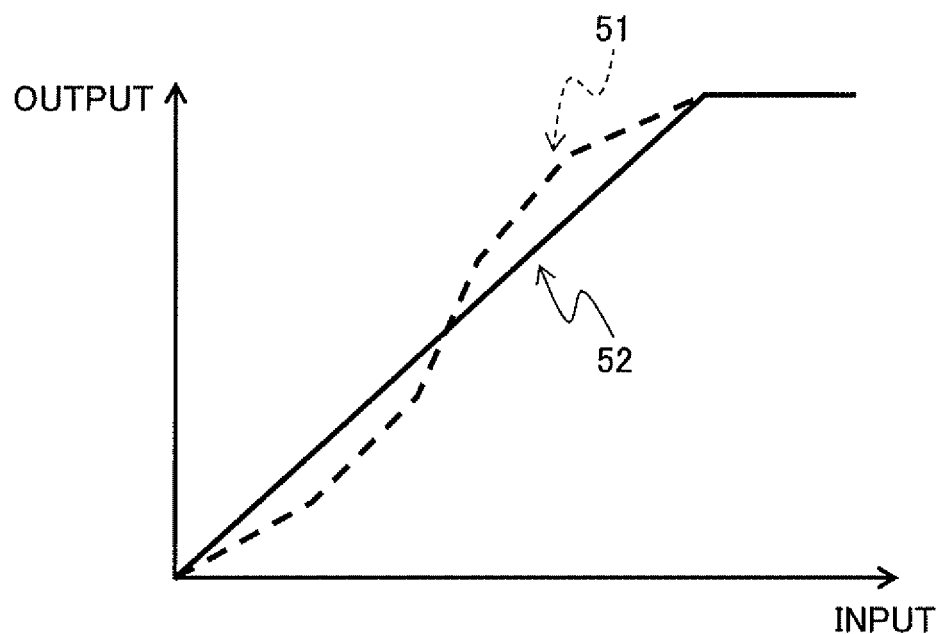
FIG. 5 is a diagram for explaining the control of a contrast enhancer.

On the other hand, when the histogram detecting/judging device 13 determines that the image is an image containing many high frequency components, placing greater importance on the resolution of the image is needed, and a linear characteristic of the contrast or a straight line characteristic is generated as indicated by the solid line 52 in FIG. 5. Thereby, in the case of an image containing many high frequency components, a good resolution for every gray level can be obtained.

Accordingly, irrespective of whether the image is an image containing many lowly frequency components or an image containing many high frequency components, the contrast enhancer 31 of this embodiment can adjust the contrast to the optimal contrast for each image.

Figure 6A:
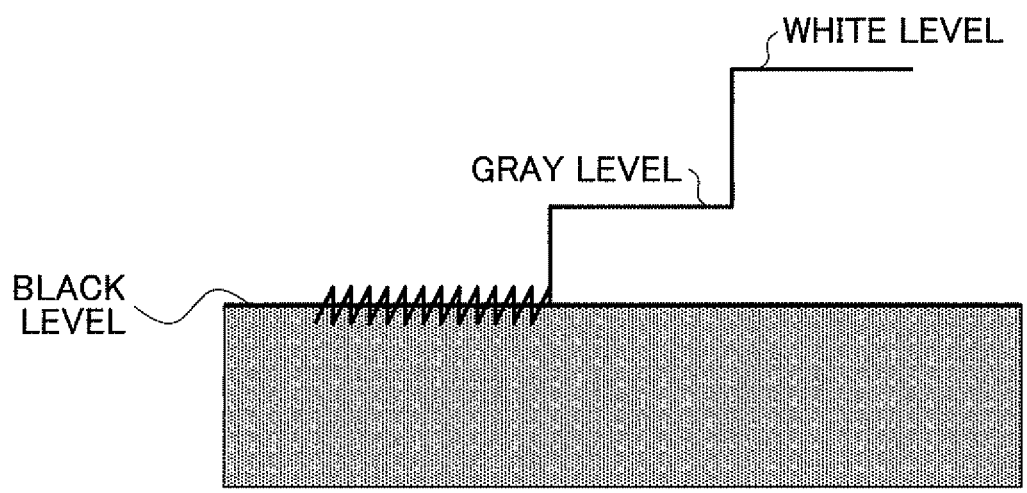
FIG. 6A is a diagram for explaining the control of a black level shifter.
Figure 6B:
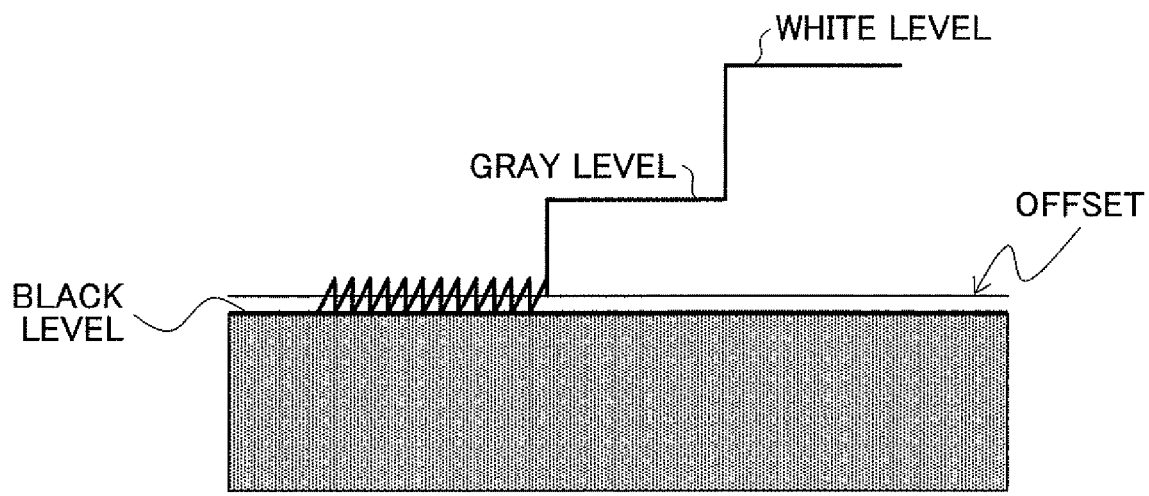
FIG. 6B is a diagram for explaining the control of a black level shifter.

Next, the control of the black level shifter 32 will be described with reference to FIGS. 6A and 6B.

The black level shifter 32 is provided to perform shift adjustment of the black level of an image. When the histogram detecting/judging device 13 determines that the image is an image containing many low frequency components, the black level is fixed as illustrated in FIG. 6A.

On the other hand, when the histogram detecting/judging device 13 determines that the image is an image containing many high frequency components, making the high frequency components conspicuous is needed even if the image is a dark image. As illustrated in FIG. 6B, the offset position of the black level is shifted to a brighter position. Accordingly, irrespective of whether the image is an image containing many low frequency components or an image containing many high frequency components, the black level shifter 32 of this embodiment can adjust the black level to the optimal level for each image.

Next, the control of the color enhancer 33 will be described with reference to FIGS. 7A and 7B.

The color enhancer 33 is provided for performing the color correction of an image. Although there are various methods of color correction, the color enhancer 33 of this embodiment makes use of the time difference of luminance and color (Y-C delay).

Figure 7A:
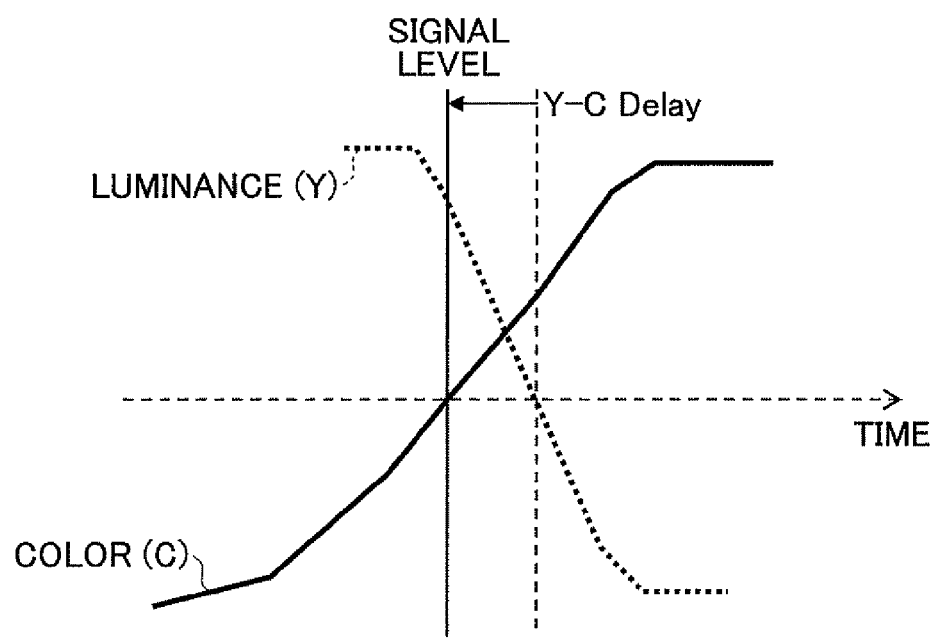
FIG. 7A is a diagram for explaining the control of a color enhancer.

When the histogram detecting/judging device 13 determines that the image is an image containing many low frequency components, the tuning accuracy of Y-C delay is lowered so that the timing of the color (C) is slightly advanced from the timing of the luminance (Y) as illustrated in FIG. 7A. Thereby, the sharpness of the color can be increased.

Figure 7B:
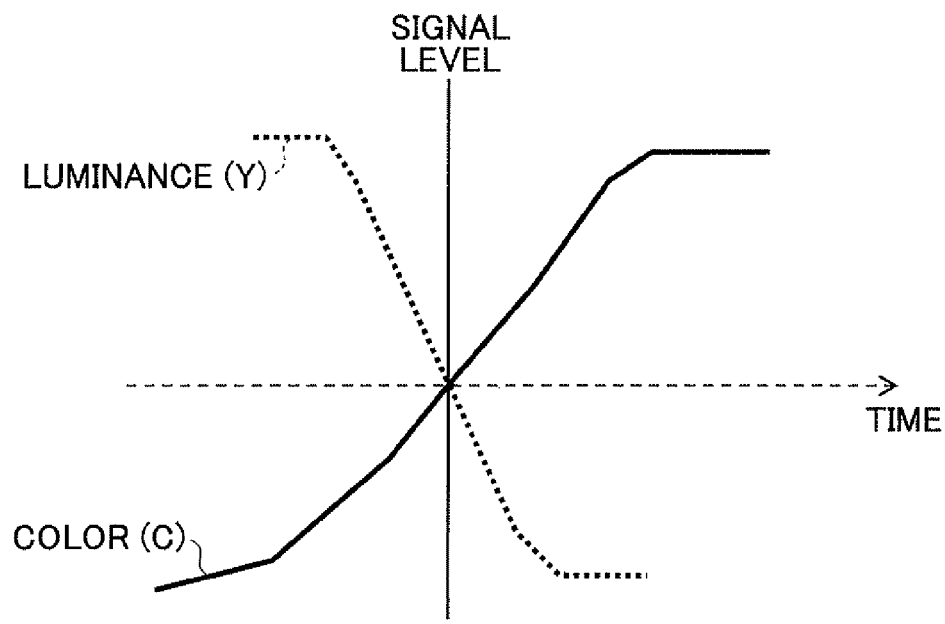
FIG. 7B is a diagram for explaining the control of a color enhancer.

On the other hand, when the histogram detecting/judging device 13 determines that the image is an image containing many high frequency components, the tuning accuracy of Y-C delay is raised so that the center of the color (C) matches the center of the luminance (Y) (centering) as illustrated in FIG. 7B. Thereby, the image quality with a reduced color deviation can be obtained. In the case of an image containing many high frequency components, if such centering is not performed, a color deviation will become conspicuous and the image quality will be degraded. Accordingly, irrespective of whether the image is an image containing many low frequency components or an image containing many high frequency components, the color enhancer 33 of this embodiment can perform the color correction that is optimal for each image.

Figure 8A:
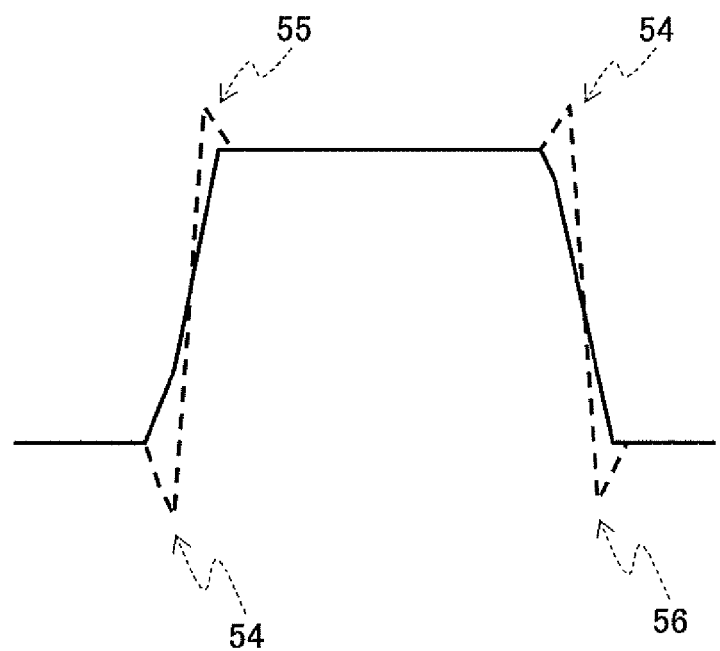
FIG. 8A is a diagram for explaining the control of a picture sharpness unit.

Next, the control of the picture sharpness unit 34 will be described with reference to FIGS. 8A and 8B.

The picture sharpness unit 34 is provided for performing the adjustment of the outline of an image. When the histogram detecting/judging device 13 determines that the image is an image containing many low frequency components, the amounts of the preshoots 54, the overshoot 55 and the undershoot 56 at the edges of the signal indicated by the solid line in FIG. 8A are enlarged as indicated by the dotted lines in FIG. 8A, so that the sharpness is raised and the outline of the image is emphasized.

Figure 8B:
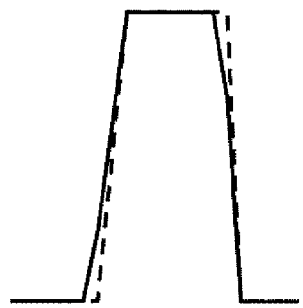
FIG. 8B is a diagram for explaining the control of a picture sharpness unit.

On the other hand, when the histogram detecting/judging device 13 determines that the image is an image containing many high frequency components, the amounts of the preshoots 54, the overshoot 55, and the undershoot 56 at the edges of the signal indicated by the solid line in FIG. 8B are reduced as indicated by the dotted lines in FIG. 8B, so that the slope of the signal is made steep and the sharpness is raised. Because the slope for the high frequency components is inherently steep, if the amounts of the preshoots or the overshoot are enlarged, then the image quality will be degraded. Accordingly, irrespective of whether the image is an image containing many low frequency components or an image containing many high frequency components, the picture sharpness unit 34 of this embodiment can perform the adjustment of the outline to provide the optimal sharpness for each image.

Next, the control of the noise reducing device 35 will be described.

Figure 9A:
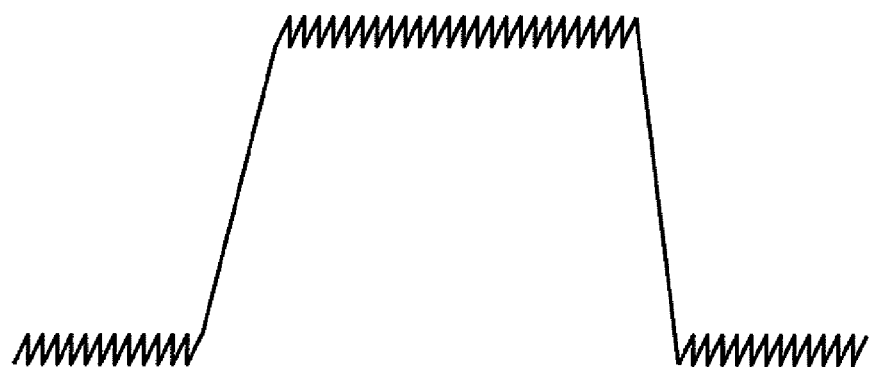
FIG. 9A is a diagram for explaining the control of a noise reducing device.
Figure 9B:
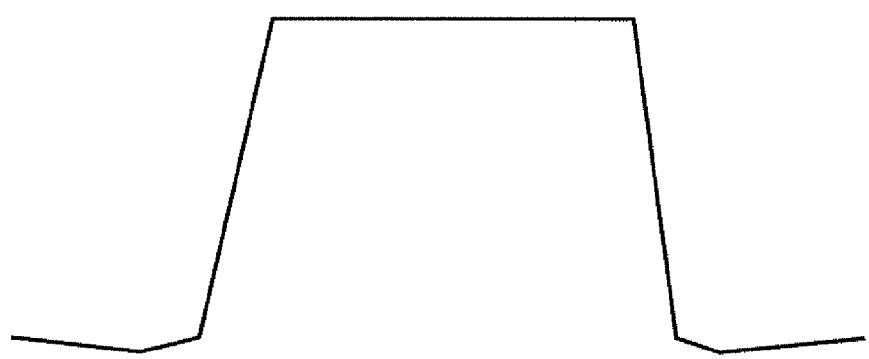
FIG. 9B is a diagram for explaining the control of a noise reducing device.

The noise reducing device 35 is provided to reduce the noise of a signal. When the histogram detecting/judging device 13 determines that the image is an image containing many low frequency components, the noise reduction function is performed. Specifically, the signal as illustrated in FIG. 9A is subjected to the noise reduction function, and the signal as illustrated in FIG. 9B is obtained.

Figure 10A:
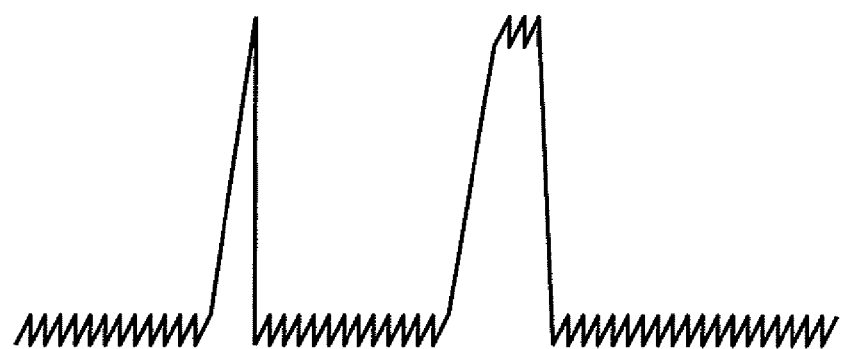
FIG. 10A is a diagram for explaining the control of a noise reducing device.
Figure 10B:
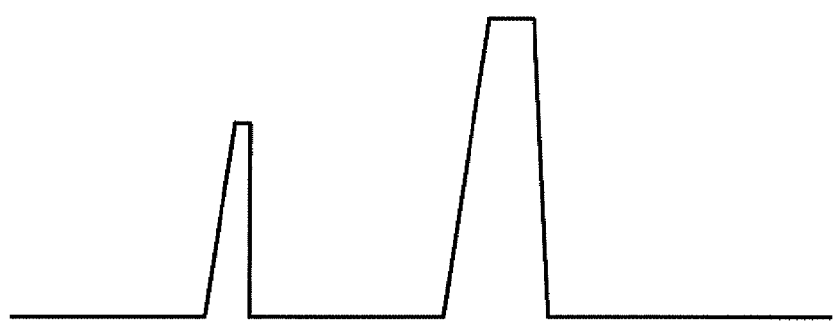
FIG. 10B is a diagram for explaining the control of a noise reducing device.

On the other hand, when the histogram detecting/judging device 13 determines that the image is an image containing many high frequency components, if the signal of the high frequency components as illustrated in FIG. 10A is subjected to the noise reduction function, the signal component will be reduced with the noise as illustrated in FIG. 10B. For this reason, in the case of an image containing many high frequency components, it is desirable that the noise reduction function is not performed. Accordingly, irrespective of whether the image is an image containing many low frequency components or an image containing many high frequency components, the noise reducing device 35 of this embodiment can perform the noise reduction function which is appropriate for each image.

Figure 11A:
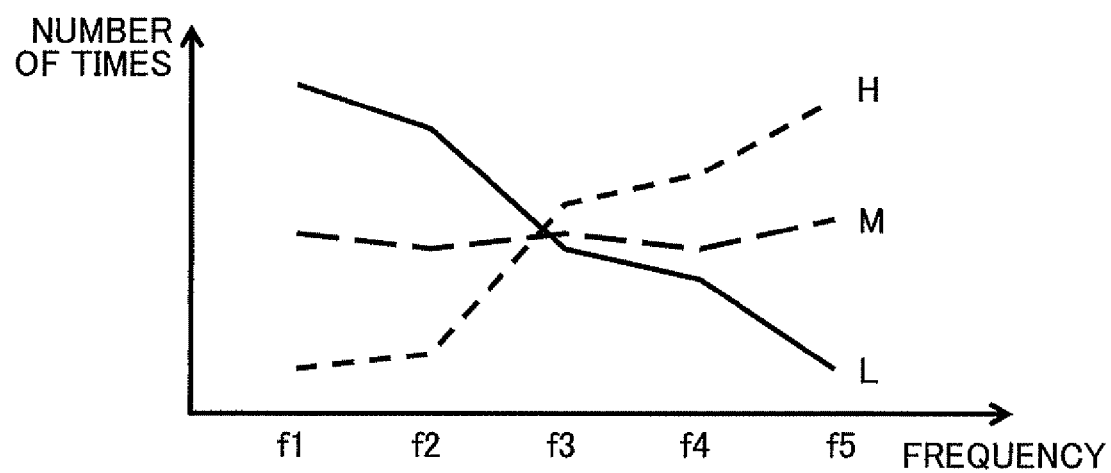
FIG. 11A is a diagram for explaining the relationship between the histogram for each frequency band and the image quality control.

FIGS. 11A and 11B are diagrams for explaining the image quality control performed by the above-described image quality control circuit 14. In this embodiment, as illustrated in FIG. 11A, the image represented by the input video signal is classified into an image (H) containing many high frequency components, an image (M) containing average frequency components only, and an image (L) containing many low frequency components. Typical patterns of the histograms of the respective frequency bands (namely, line graphs) are illustrated in FIG. 11A.

Subsequently, as illustrated in FIG. 11B, each of the image (H) containing many high frequency components, the image (M) containing average frequency components only, and the image (L) containing many low frequency components is respectively subjected to the image quality control of the contrast enhancer 31, the black level shifter 32, the color enhancer 33, the picture sharpness unit 34, and the noise reducing device 35, which is performed by the image quality control circuit 14. In the case of the image containing average frequency components only, an intermediate level of the image quality control between the control levels of the cases of the image containing many slowly varying components and the image containing many high frequency components is performed.

Alternatively, the images may be electronically processed based on the information of the extracted frequency of each frequency band without generating a histogram.

Second Embodiment

Figure 12:
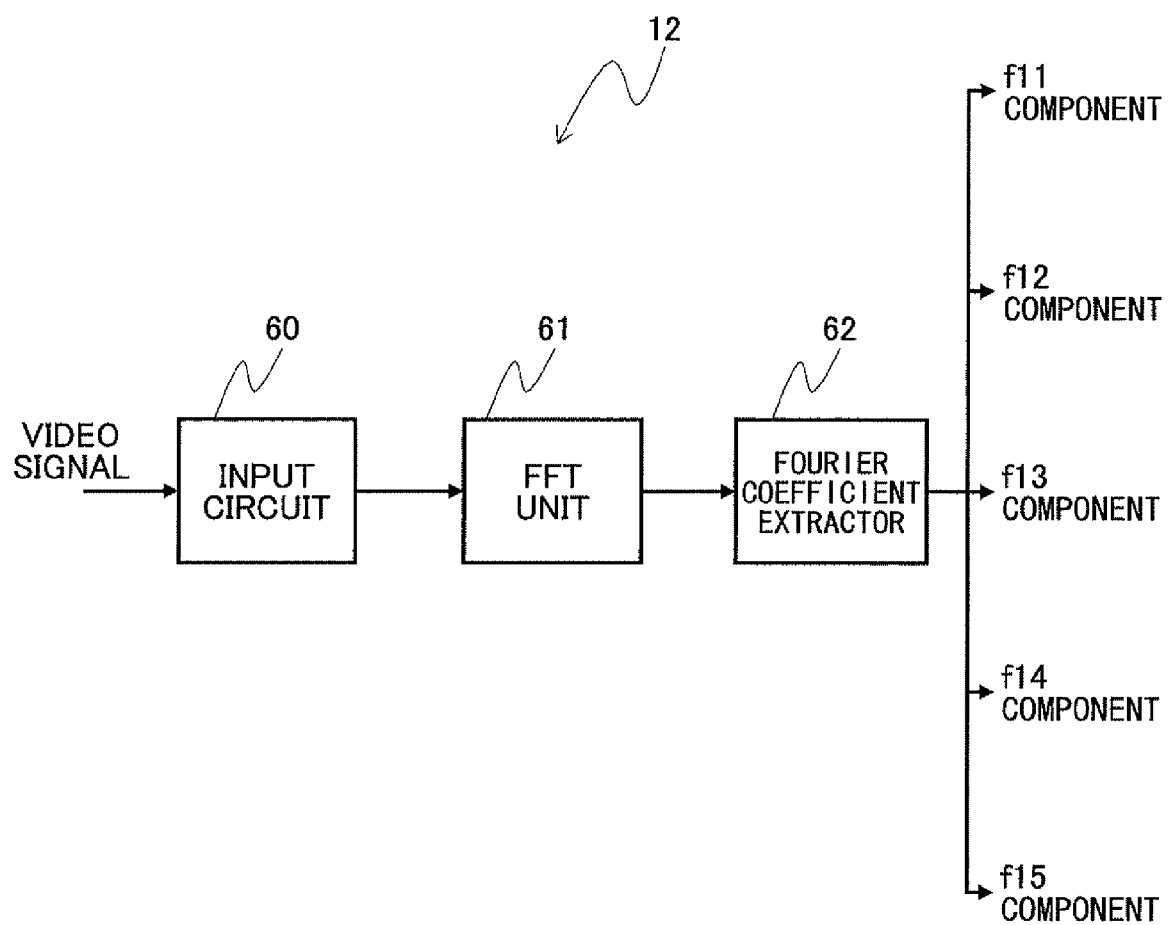
FIG. 12 is a diagram illustrating the composition of a frequency analyzing device using a Fourier analyzing device in a video display device of a second embodiment of the present disclosure.

A video display device of a second embodiment of the present disclosure is arranged to include a frequency analyzing device 12 which uses a Fourier analyzing device. FIG. 12 illustrates the composition of the frequency analyzing device 12 using the Fourier analyzing device in this embodiment.

The frequency analyzing device 12 in this embodiment includes a fast Fourier transform unit 61 and a Fourier coefficient extractor 62. An input video signal indicating video information of one screen is supplied to an input circuit 60, the video signal is supplied from the input circuit 60 to the fast Fourier transform unit 61, and the Fourier analysis of the image of one screen is performed by the fast Fourier transform unit 61. The result of the Fourier analysis is supplied from fast Fourier transform unit 61 to the Fourier coefficient extractor 62. In the Fourier coefficient extractor 62, a frequency of each of frequency components f11, f12, f13, f14 and f15 is extracted from the result of the Fourier analysis.

Subsequently, similar to the first embodiment, the frequency of each frequency band is generated, i.e., the histogram of the respective frequency components is generated, and the frequency or the histogram is supplied to the image quality control circuit 14 illustrated in FIG. 1.

The image quality control of the contrast enhancer 31, the black level shifter 32, the color enhancer 33, the picture sharpness unit 34, and the noise reducing device 35 is performed based on the frequency or the histogram.

Accordingly, the image quality control can be performed using the Fourier analyzing device to display a high-definition image with high image quality.

Third Embodiment

Figure 13:
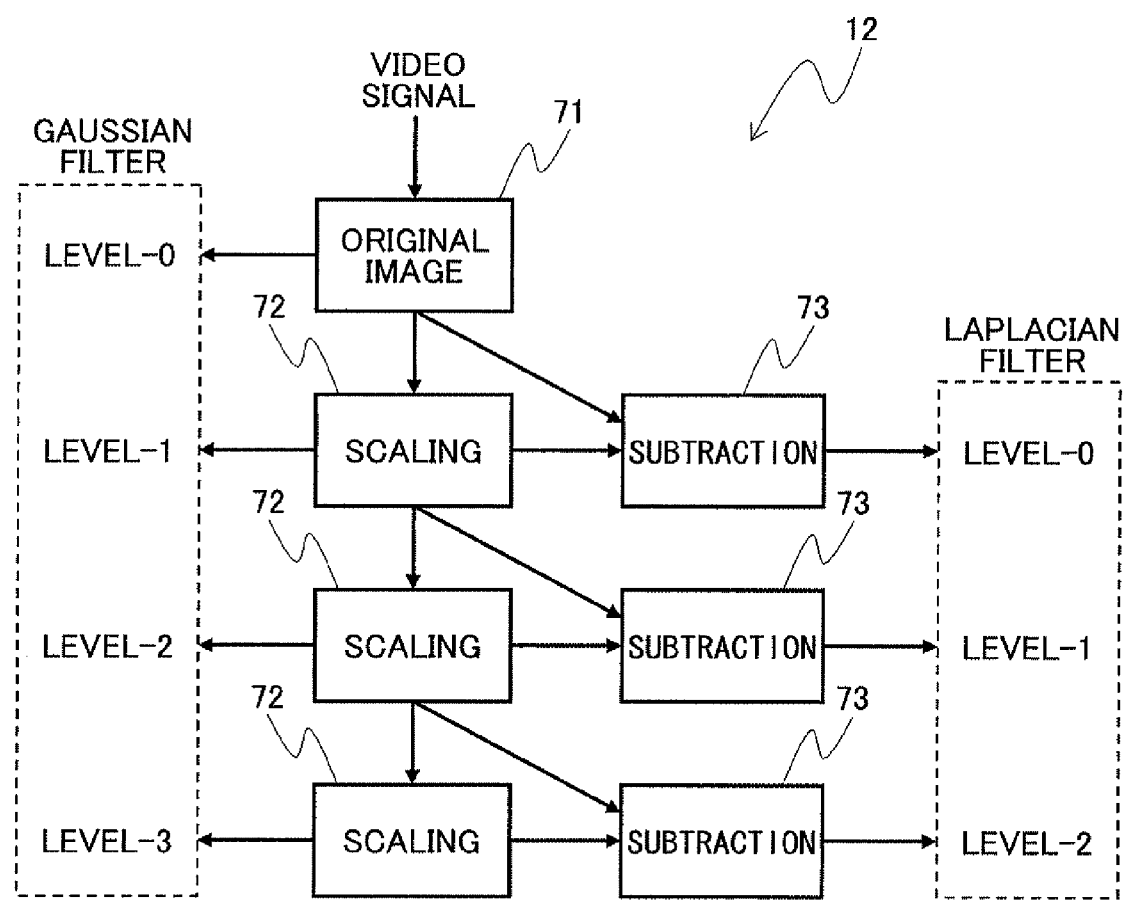
FIG. 13 is a diagram illustrating the composition of a frequency analyzing device using Gaussian-Laplacian filters in a video display device of a third embodiment of the present disclosure.

A video display device of a third embodiment of the present disclosure is arranged to include a frequency analyzing device 12 which uses Gaussian-Laplacian filters. The frequency analyzing device 12 using the Gaussian-Laplacian filters in this embodiment will be described with reference to FIG. 13.

In this embodiment, using the Gaussian-Laplacian filters, the input video signal is decomposed into vertical frequency components and horizontal frequency components, and the frequency of each frequency band is extracted using the Gaussian filter and the Laplacian filter, and the histogram of the respective frequency bands is generated.

Specifically, the video signal which is the original image (71) is input, the primary scaling (72) is performed with the Gaussian filter, and the Gaussian level-1 is obtained. The output of the primary scaling (72) which is the Gaussian level-1 is subtracted (73) from the original image, and the Laplacian level-0 which is the 0th Laplacian component is obtained.

By repeating the same operation, the Gaussian level-2, the Gaussian level-3, the Laplacian level-1, and the Laplacian level-2 are obtained. Thus, the distribution of the signal frequencies is computed based on the obtained video information of one screen, and the histogram of each frequency band is generated.

Subsequently, similar to the first embodiment, the image quality control of the contrast enhancer 31, the black level shifter 32, the color enhancer 33, the picture sharpness unit 34, and the noise reducing device 35 is performed based on the histogram by the image quality control circuit 14 as illustrated in FIG. 1.

It should be noted that the method using the Gaussian-Laplacian filters has a feature that the method is appropriately consistent with the digital image compression technology (Wavelet transform).

It is preferred that, when an image is displayed on a large-sized high-definition display unit, the detection accuracy in the frequency component analyzing device 12 is raised to perform in-depth image quality control, and when an image is displayed on a small-sized display unit, the detection accuracy in the frequency component analyzing device 12 is lowered.

The present disclosure is not limited to the above-described embodiments and variations and modifications may be made without departing from the scope of the present disclosure.

Industrial Applicability

The present disclosure is applicable to a video display device, such as a television or a monitor.

The present international application is based upon and claims the benefit of priority of the prior Japanese patent application No. 2008-232712, filed on Sep. 10, 2008, the contents of which are incorporated herein by reference in their entirety.

The invention claimed is:

1. A video display device which displays an image of an input video signal, comprising:
   a frequency component analyzing device that receives the input video signal and extracts a frequency of each of frequency bands from video information of one screen with respect to the image; and
   an image quality control circuit that performs an image quality control of the image based on a distribution of the extracted frequencies of each of the frequency bands,
   wherein the image quality control device performs image quality control processes for all of a linear compensation of contrast, a black level offset, a color correction, a sharpness, and a noise reduction function based on the distribution of the extracted frequencies of each of the frequency bands,
   wherein the image quality control circuit comprises a contrast enhancer, a black level shifter, a color enhancer, a picture sharpness unit, and a noise reducing device, each of which is connected to an output of the frequency component analyzing device and receives the distribution of the extracted frequencies of each of the frequency bands output from the frequency component analyzing device,
   wherein the contrast enhancer is configured to change a level of the contrast to a higher contrast level to generate a characteristic curve of the contrast with a larger gamma correction when the image of the video signal is determined as containing many low frequency components, and generate a linear characteristic curve of the contrast when the image of the video signal is determined as containing many high frequency components,
   wherein the black level shifter is configured to fix the black level when the image of the video signal is determined as containing many low frequency components, and shift an offset position of the black level to a brighter position when the image of the video signal is determined as containing many high frequency components,
   wherein the color enhancer is configured to lower a tuning accuracy of Y-C delay to advance a timing of color C from a timing of luminance Y when the image of the video signal is determined as containing many low frequency components, and raise the tuning accuracy of the Y-C delay such that a center of the color C matches a center of the luminance Y when the image of the video signal is determined as containing many high frequency components,
   wherein the picture sharpness unit is configured to enlarge amounts of edges of the video signal to raise the sharpness when the image of the video signal is determined as containing many low frequency components, and reduce the amounts of the edges of the video signal when the image of the video signal is determined as containing many high frequency components, and
   wherein the noise reducing device is configured to perform the noise reduction function when the image of the video signal is determined as containing many low frequency components, and inhibit performing the noise reduction function when the image of the video signal is determined as containing many high frequency components.

2. The video display device according to claim 1, wherein the frequency component analyzing device includes a plurality of band pass filters.

3. The video display device according to claim 1, wherein the frequency component analyzing device includes a Fourier analyzing device.

4. The video display device according to claim 1, wherein the frequency component analyzing device includes Gaussian-Laplacian filters.

5. The video display device according to claim 1, wherein the image of the video signal is determined as being one of an image containing many high frequency components, an image containing many low frequency components, and an image containing average frequency components based on the histogram of each of the frequency bands.

6. The video display device according to claim 1, wherein the frequency component analyzing device is configured to generate the histogram of each of the frequency bands based on the extracted frequencies.

7. The video display device according to claim 6, further comprising a histogram detecting and judging device that determines the image of the video signal as being one of an image containing many high frequency components, an image containing many low frequency components, and an image containing average frequency components based on the histogram of each of the frequency bands output from the frequency component analyzing device.

8. The video display device according to claim 1, wherein the video signal is a video signal of a motion picture.

* * * * *